(12) United States Patent
Altice

(10) Patent No.: US 7,696,464 B2
(45) Date of Patent: Apr. 13, 2010

(54) IMAGING DEVICE WITH REDUCED ROW READOUT TIME AND METHOD OF OPERATING THE SAME

(75) Inventor: Parker Altice, Meridian, ID (US)

(73) Assignee: Aptina Imaging Corp., George Town, Grand Cayman (KY)

( * ) Notice: Subject to any disclaimer, the term of this patent is extended or adjusted under 35 U.S.C. 154(b) by 14 days.

(21) Appl. No.: 12/078,642

(22) Filed: Apr. 2, 2008

(65) Prior Publication Data

US 2008/0237449 A1    Oct. 2, 2008

Related U.S. Application Data

(63) Continuation of application No. 11/401,952, filed on Apr. 12, 2006, now Pat. No. 7,368,698.

(51) Int. Cl.
*H01L 27/00* (2006.01)

(52) U.S. Cl. .................. 250/208.1; 348/230.1; 348/302; 348/308

(58) Field of Classification Search .............. 250/208.1; 348/230.1, 302, 308
See application file for complete search history.

(56) References Cited

U.S. PATENT DOCUMENTS

| | | | |
|---|---|---|---|
| 6,037,577 A | 3/2000 | Tanaka et al. | |
| 6,140,630 A | 10/2000 | Rhodes | |
| 6,204,524 B1 | 3/2001 | Rhodes | |
| 6,310,366 B1 | 10/2001 | Rhodes | |
| 6,320,616 B1 | 11/2001 | Sauer | |
| 6,326,652 B1 | 12/2001 | Rhodes | |
| 6,333,205 B1 | 12/2001 | Rhodes | |
| 6,376,868 B1 | 4/2002 | Rhodes | |
| 6,795,121 B2 * | 9/2004 | Matsunaga et al. | 348/308 |
| 2003/0025816 A1 | 2/2003 | Sakuragi | |
| 2004/0159788 A1 | 8/2004 | Shigenaka et al. | |
| 2004/0263656 A1 | 12/2004 | Simony | |
| 2005/0040445 A1 | 2/2005 | Mouli | |
| 2007/0109879 A1 | 5/2007 | Mabuchi | |

* cited by examiner

*Primary Examiner*—Seung C Sohn
(74) *Attorney, Agent, or Firm*—Dickstein Shapiro LLP

(57) ABSTRACT

An imager in which a column line bias current control signal is pulsed at some time during and/or after the pulsing of the reset control and the transfer control signals to increase a bias current in a pixel column line during reset and transfer operations. The bias current is then decreased by removing the pulse before the sampling and storing of reset and image signals. Pulsing the bias control voltage signal and thus, the bias current, decreases the settling time of the column line, while maintaining the required low current during sampling and storage of the reset and image signals.

18 Claims, 4 Drawing Sheets

IMAGING DEVICE WITH REDUCED ROW READOUT TIME AND METHOD OF OPERATING THE SAME

CROSS-REFERENCE TO RELATED APPLICATIONS

This application is a continuation of U.S. patent application Ser. No. 11/401,952, filed on Apr. 12, 2006 now U.S. Pat. No. 7,368,698, the subject matter of which is incorporated in its entirety by reference herein.

FIELD OF THE INVENTION

The invention relates generally to imaging devices and more particularly to an imaging device with improved row readout time.

BACKGROUND

A CMOS imager circuit includes a focal plane array of pixel cells, each one of the cells including a photosensor, for example, a photogate, photoconductor or a photodiode for accumulating photo-generated charge in a portion of the substrate. Each pixel cell has a readout circuit that includes at least an output field effect transistor formed on the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the functions of: (1) photon to charge conversion; (2) accumulation of image charge; (3) selection of a pixel for readout; (4) resetting the storage region to a known state before the transfer of charge to it and output of an amplification of a signal representing the reset state; (5) transfer of charge to the storage region; and (6) output and amplification of a signal representing image charge. Photo charge may be amplified when it moves from the initial charge accumulation region to the storage region. The reset and image charge at the storage region is typically converted to a reset Vrst and image Vsig pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

FIG. 1 illustrates a portion of a conventional CMOS imager 10 employing a four transistor (4T) pixel 20. The illustrated imager 10 includes a pixel 20, one of many that are in a pixel array, connected to a column sample and hold circuit 40 by a column line 32. The imager 10 also includes a readout programmable gain amplifier (PGA) 70 and an analog-to-digital converter (ADC) 80.

The illustrated pixel 20 includes a photosensor 22 (e.g., a pinned photodiode, photogate, etc.), transfer transistor 24, floating diffusion region FD, reset transistor 26, source follower transistor 28 and row select transistor 30. The photosensor 22 is connected to the floating diffusion region FD by the transfer transistor 24 when the transfer transistor 24 is activated by a transfer control signal TX. The reset transistor 26 is connected between the floating diffusion region FD and an array pixel supply voltage Vaa-pix. A reset control signal RST is used to activate the reset transistor 26, which resets the floating diffusion region FD prior to transfer of charge from the photosensor 22.

The source follower transistor 28 has its gate connected to the floating diffusion region FD and is connected between the array pixel supply voltage Vaa-pix and the row select transistor 30. The source follower transistor 28 converts the stored charge at the floating diffusion region FD into an electrical output voltage signal. The row select transistor 30 is controllable by a row select signal ROW_SELECT for selectively connecting the source follower transistor 28 and its output voltage signal to the column line 32.

The column sample and hold circuit 40 includes a current bias transistor 56, controlled by a control voltage signal $V_{LN}$, that is used to bias the column line 32. The column line 32 is also connected to a first capacitor 44 thru a sample and hold reset signal switch 42. The sample and hold reset signal switch 42 is controlled by the sample and hold reset control signal S/H_RESET. The column line 32 is also connected to a second capacitor 54 thru a sample and hold pixel signal switch 52. The sample and hold pixel signal switch 52 is controlled by the sample and hold pixel control signal S/H_SIGNAL. The switches 42, 52 are typically MOSFET transistors.

A second terminal of the first capacitor 44 is connected to the amplifier 70 via a first column select switch 50, which is controlled by a column select signal COLUMN_SELECT. The second terminal of the first capacitor 44 is also connected to a clamping voltage VCL via a first clamping switch 46. Similarly, the second terminal of the second capacitor 54 is connected to the amplifier 70 by a second column select switch 60, which is controlled by the column select signal COLUMN_SELECT. The second terminal of the second capacitor 54 is also connected to the clamping voltage VCL by a second clamping switch 48. An equalizing switch 58 may also be optionally connected across the output sides of capacitors 44 and 54 to equalize the clamp voltage VCL applied to the two capacitors.

The clamping switches 46, 48 are controlled by a clamping control signal CLAMP. As is known in the art, the clamping voltage VCL is used to place a charge on the two capacitors 44, 54 before the reset and image output signals are stored on the capacitors 44, 54, respectively in response to sample and hold control signals S/H_RESET, S/H_SIGNAL.

Referring to FIGS. 1 and 2, in operation, the row select signal ROW_SELECT is driven high, which activates the row select transistor 30. When activated, the row select transistor 30 connects the source follower transistor 28 to the column line 32. The reset signal RST is then pulsed to activate the reset transistor 26, which resets the floating diffusion region FD. The signal on the floating diffusion region FD provides a reset output signal Vrst which is sampled when the sample and hold reset control signal S/H_RESET is pulsed. At this point, the first capacitor 44 stores the pixel reset signal Vrst.

Afterwards, the transfer transistor control signal TX is pulsed, causing charge from the photosensor 22 to be transferred to the floating diffusion region FD. The signal on the floating diffusion region FD provides an image signal Vsig which is sampled when the sample and hold pixel control signal S/H_SIGNAL is pulsed. At this point, the second capacitor 54 stores a pixel image signal Vsig. A differential signal (Vrst-Vsig) is produced by the differential amplifier 70. The differential signal is digitized by the analog-to-digital converter 80. The analog-to-digital converter 80 supplies the digitized pixel signals to an image processor (not shown), which forms a digital image output. Throughout the operation, the control voltage signal $V_{LN}$, used to bias the column line 32, is maintained at a constant low level, causing a constant low current to flow through bias transistor 56.

A low current ($i_{VLN}$) through bias transistor 56 is desired in order to increase the gain and uniformity in response of the source follower transistor 28. However, the capacitive time constant ($\tau$) of the column line 32 depends on the capacity ($C_{LN}$) of the column line 32 times the resistance (R) from the bias transistor 56, as expressed below in equation (1). The capacitive time constant ($\tau$) is the exponential time constant for the circuit to reach a stable mode of operation. The resistance (R) is calculated as the voltage (v) divided by the current ($i_{VLN}$). Lowering the current $i_{VLN}$ to maintain the desired effect on the source follower transistor 28, however, will increase the settling time, as shown below:

$$\left( \tau = C_{LN}R = C_{LN}\frac{\Delta v}{i_{VLN}} \right) \qquad (1)$$

Accordingly, it is desired to decrease the capacitive time constant ($\tau$) of the column line 32 while still maintaining a low current ($i_{VLN}$) across the bias transistor 56 during charge sampling to maintain the desired gain and uniformity in the response of the source follower transistor 28. A decreased capacitive time constant ($\tau$) will result in an improved row readout time, which is also desirable.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

The invention relates to an imager in which a column line bias current control signal is pulsed at some point during and/or after the pulsing of the reset control and the transfer control signals to increase a bias current in a pixel column line during reset and transfer operations. The bias current is then decreased by removing the pulse before the sampling and storing of reset and image signals. Pulsing the bias control voltage signal and thus, the bias current, decreases the settling time of the column line, while maintaining the required low current during sampling and storage of the reset and image signals.

Figure 1:
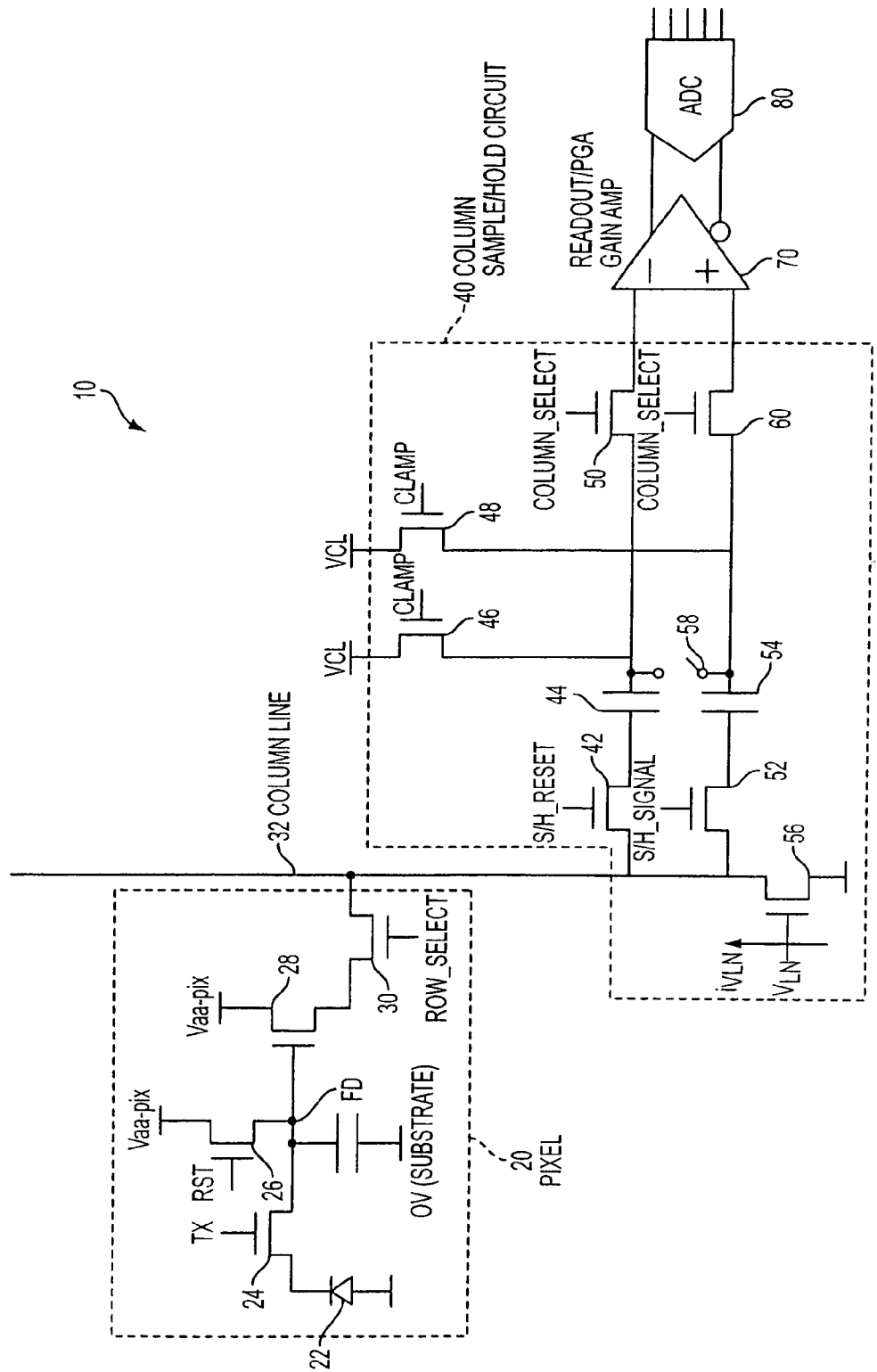
FIG. 1 is a diagram of a portion of a typical CMOS imager.
Figure 2:
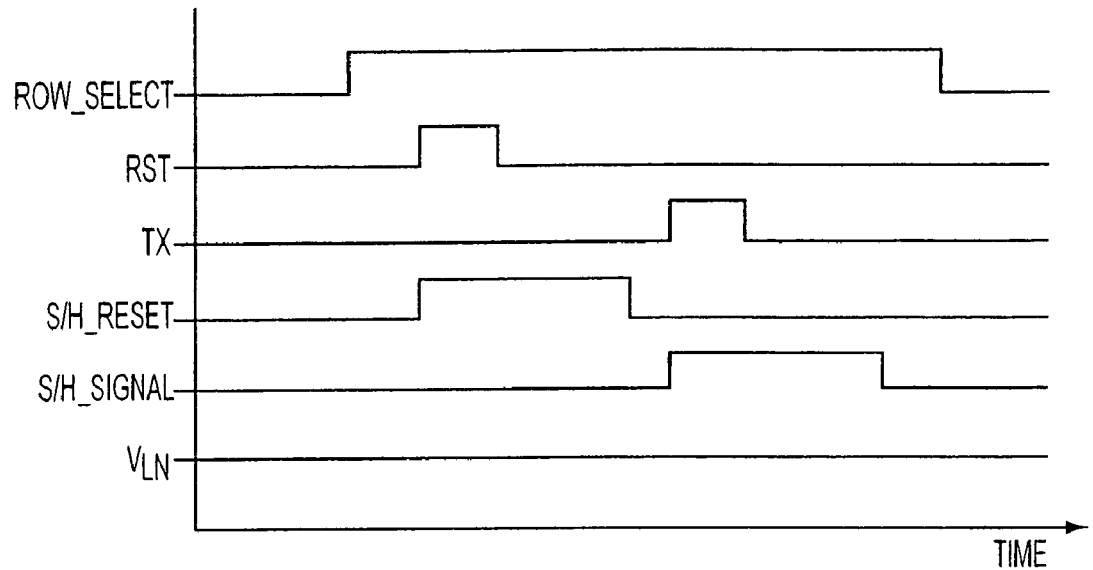
FIG. 2 is a timing diagram of the operation of the FIG. 1 imager in accordance with the prior art technique.
Figure 3:
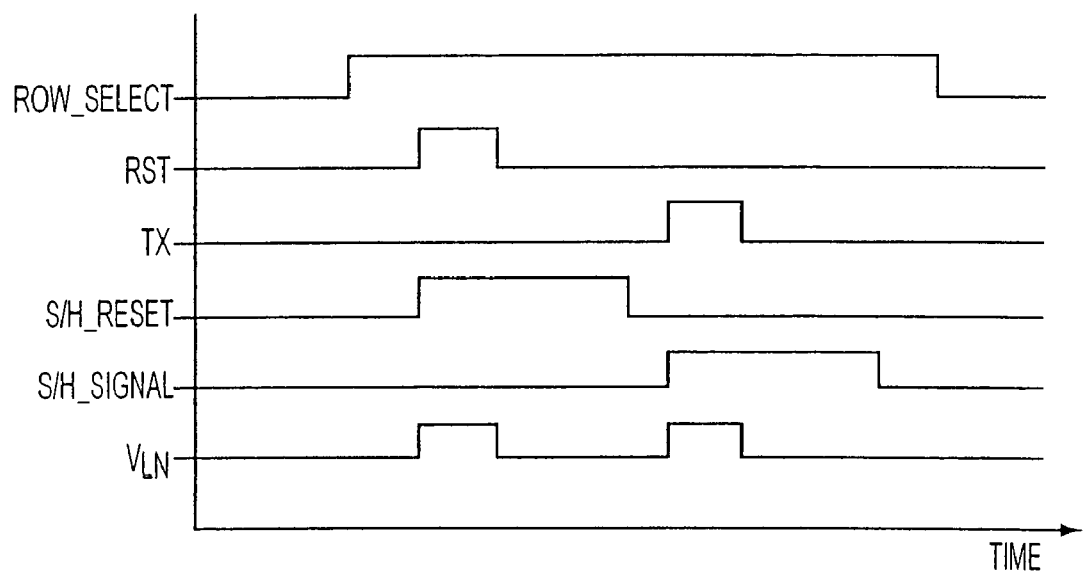
FIG. 3 is a timing diagram of the operation of the FIG. 1 imager in accordance with the invention.

Referring to FIGS. 1 and 3, an operation of imager 10 in accordance with the invention is now described. Initially, the row select signal ROW_SELECT is driven high, which activates the row select transistor 30. When activated, the row select transistor 30 connects the source follower transistor 28 to the column line 32. It should be noted that the row select transistor 30 can be placed before or after the source follower transistor 28 and still maintain operation of the invention. The reset signal RST is then pulsed to activate the reset transistor 26, which resets the floating diffusion region FD. The bias control voltage signal $V_{LN}$ is pulsed, either at the same time as or after the pulsing of the reset signal RST, to cause a higher current (described below) to flow through the bias transistor 56 than flows when the reset Vrst and image Vsig signals are sampled. The duration of the pulse may be the same as the duration of the reset pulse RST, however this is not required. Once the reset RST and bias control voltage $V_{LN}$ signals are returned to their low states, the signal on the floating diffusion region FD produces the reset signal Vrst which is then sampled when the sample and hold reset control signal S/H_RESET is pulsed. At this point, the first capacitor 44 stores the pixel reset signal Vrst.

Afterwards, the transfer transistor control signal TX is pulsed, causing charge from the photosensor 22 to be transferred to the floating diffusion region FD. The bias control voltage signal $V_{LN}$ is pulsed, either at the same time as or after the pulsing of the transfer transistor control signal TX, to cause the higher current to again flow through the bias transistor 56. The duration of the pulse may be the same as the duration of the transfer transistor control signal TX, however this is not required. Once the transfer transistor control TX and bias control voltage $V_{LN}$ signals are returned to their low states, the image signal Vsig associated with the transferred charge is sampled when the sample and hold pixel control signal S/H_SIGNAL is pulsed. At this point, the second capacitor 54 stores a image signal Vsig. A differential signal (Vrst-Vsig) is produced by the differential amplifier 70. The differential signal is digitized by the analog-to-digital converter 80. The analog-to-digital converter 80 supplies the digitized pixel signals to an image processor (not shown), which forms a digital image output.

According to the invention, the bias current caused by the control voltage signal $V_{LN}$, used to bias the column line 32, is increased for a short period of time, and then decreased before the storing of the signals Vrst and Vsig. Example currents through transistor 56 may be a low value of about 100 nA to about 15 µA and a high value of about 25 µA to about 1 mA. As can be seen in FIG. 3, the control voltage signal $V_{LN}$ is increased when the reset signal RST is pulsed and decreased before the first capacitor 44 stores the pixel reset signal Vrst. The control voltage signal $V_{LN}$ is again increased when the transfer transistor control signal TX is pulsed and decreased before the second capacitor 54 stores the pixel image signal Vsig. When not pulsing the bias current, the control voltage signal $V_{LN}$ is maintained at a value between $V_{SS}$ and $V_{DD}$, meaning that the voltage is maintained above zero.

By pulsing the control voltage signal $V_{LN}$ in this manner, the resulting bias current is increased for a short period of time, thereby decreasing the resistance of the column line 32 and lowering the capacitive time constant ($\tau$) (from Equation 1). However, by decreasing the bias current before the sampling and storage of the reset and pixel charge, the required low current value for increasing the gain and uniformity of the source follower transistor 28 is maintained. The pulsing of the control voltage signal $V_{LN}$ is controlled by a timing and control circuit. For example, the timing and control circuit 1150 of FIG. 4, which supplies the signals for operating the pixels of array 1020 and the sample and hold circuit timing, may also supply the control signal.

The invention may also contain different readout circuitry and still be within the scope of the invention. Additionally, the circuit may have a line enable transistor (not shown) placed in series with the bias transistor 56. The bias transistor 56 may also be part of a current mirror and the current setting transistor (not shown) in the current mirror is pulsed, which causes the bias transistor 56 to be pulsed as well.

Figure 4:
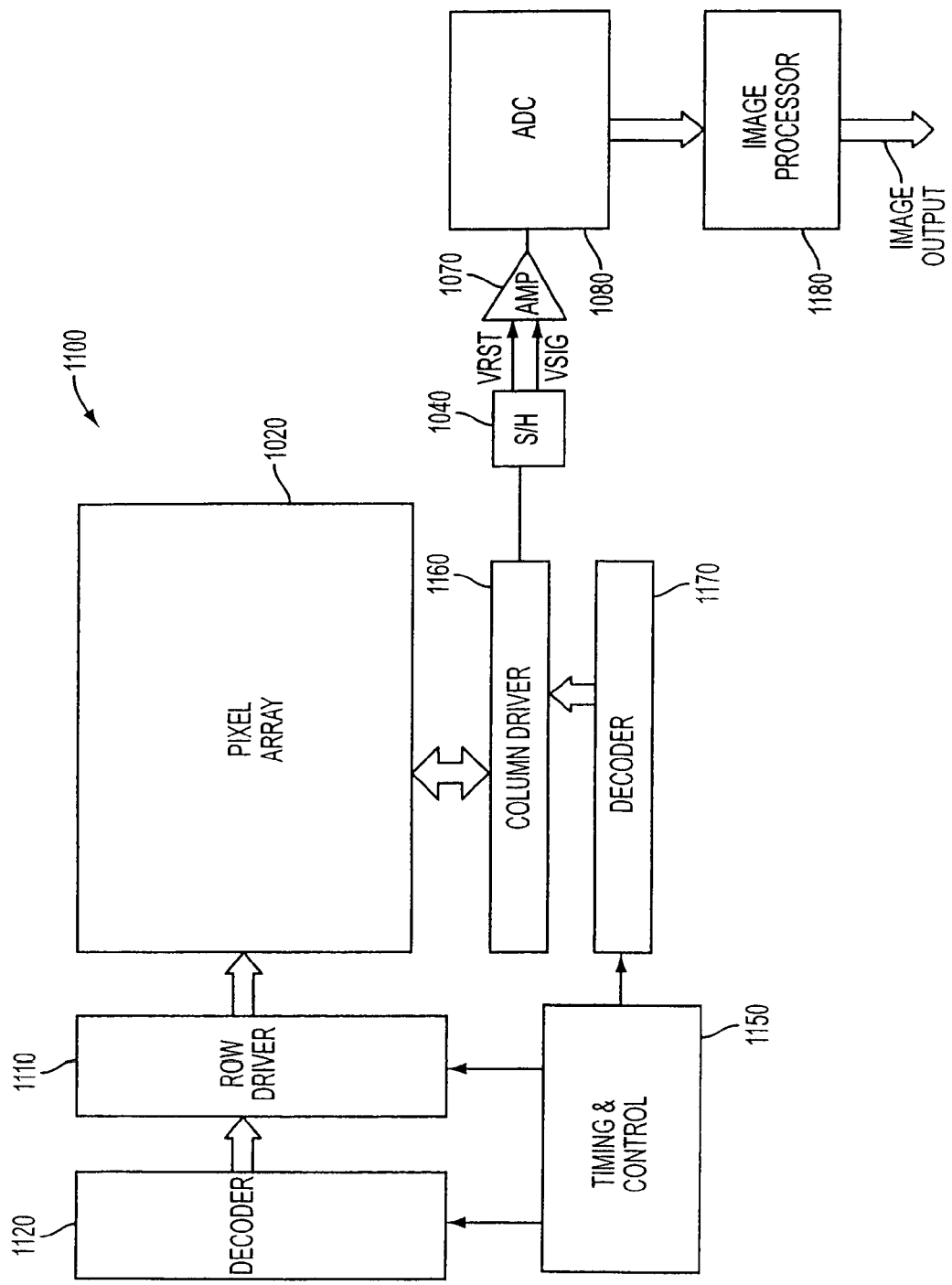
FIG. 4 is a diagram of a CMOS imager utilizing the FIG. 3 timing.

FIG. 4 illustrates an exemplary CMOS imager 1100 that may be operated in accordance with the invention. The CMOS imager 1100 includes a pixel array 1020 comprising pixels 20 of FIG. 1. The CMOS pixel array 1020 circuitry is conventional and is only briefly described herein. Row lines of the array 1020 are selectively activated by a row driver 1110 in response to row address decoder 1120. A column driver 1160 and column address decoder 1170 are also included in the imager 1100. The imager 1100 is operated by the timing and control circuit 1150, which controls the address decoders 1120, 1170 and row driver 1110.

A sample and hold circuit (S/H) 1040 associated with the column driver 1160 reads a pixel reset signal Vrst and a pixel image signal Vsig for selected pixels. A differential signal (Vrst-Vsig) is amplified by differential amplifier 1070 for each pixel and is digitized by an analog-to-digital converter (ADC) 1080. The analog-to-digital converter 1080 supplies the digitized pixel signals to an image processor 1180 which forms and outputs a digital image. The control circuit 1150 causes reset, transfer and sample and hold operations to be performed in accordance with the exemplary timing illustrated in FIG. 3.

Figure 5:
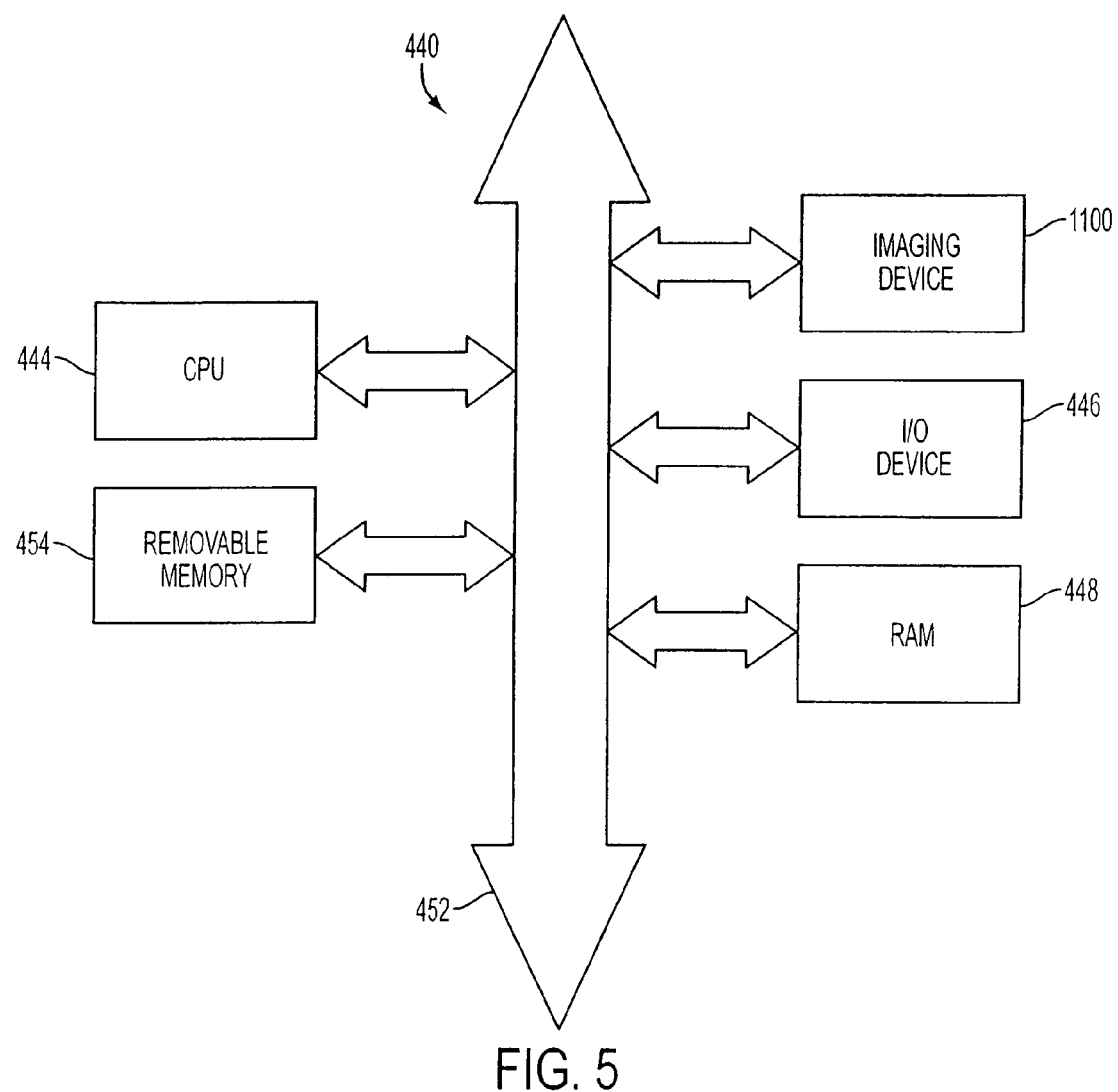
FIG. 5 shows a processor system incorporating at least one imaging device operating in accordance with an embodiment of the invention.

FIG. 5 shows system 440, a typical processor system which includes an imaging device 1100 (such as the one illustrated in FIG. 4) of the invention. The processor system 440 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other systems employing an imager.

The processor-based system 440, for example a camera system, generally comprises a central processing unit (CPU) 444, such as a microprocessor, that communicates with an input/output (I/O) device 446 over a bus 452. Imaging device 1100 also communicates with the CPU 444 over the bus 452. The processor-based system 440 also includes random access memory (RAM) 448, and can include removable memory 454, such as flash memory, which also communicates with CPU 444 over the bus 452. Imaging device 1100 may be combined with a processor, such as a CPU, digital signal processor, or microprocessor, with or without memory storage on a single integrated circuit or on a different chip than the processor.

It should further be noted that the reduction of row readout time is not limited to the above-described embodiments. For example, the timing diagram of an imager operated in accordance with the invention may be different than that of FIG. 3 and still fall within the scope and spirit of the invention, as long as the bias current is increased when needed and decreased when needed. Moreover, although the invention has been described as being part of a CMOS imager, it should be noted that the invention applies to any imager that uses row readout. That is, the invention also applies to any imager that uses an in-pixel source follower amplifier.

The processes and devices described above illustrate preferred methods and typical devices of many that could be used and produced. The above description and drawings illustrate embodiments, which achieve the objects, features, and advantages of the invention. However, it is not intended that the invention be strictly limited to the above-described and illustrated embodiments. Any modification, though presently unforeseeable, of the invention that comes within the spirit and scope of the following claims should be considered part of the invention.

What is claimed as new and desired to be protected by Letters Patent of the United States is:

1. An imaging device comprising:
    at least one pixel cell comprising:
        a photosensitive region for accumulating charges;
        a charge storage region;
        a transfer transistor for transferring accumulated charges from the photosensitive region to the charge storage region; and
        a reset transistor for resetting the charge storage region;
    a column sample and hold circuit connected to the at least one pixel cell by a column line;
    column line biasing circuitry for selectively biasing the column line with a current of one of a first lower level and a second higher level; and
    a control circuit for controlling the biasing circuitry such that a resistance on the column line is reduced before a readout of charges from the charge storage region,
    wherein a pulse used to set the bias current at the second level during a reset operation is applied during and continues after the reset pulse, and
    wherein a pulse used to set the bias current at the second level during a charge transfer operation is applied during and continues after the transfer pulse.

2. The imaging device of claim 1, wherein the control circuit reduces the resistance on the column line by setting the bias current at the second level when the reset transistor and transfer transistor are operational and setting the bias current at the first level when the reset transistor and transfer transistor are no longer operational and before the readout of charges.

3. The imaging device of claim 1, wherein the storage charge region comprises a floating diffusion region.

4. The imaging device of claim 1, wherein the first level is about 100 nA to about 15 μA.

5. The imaging device of claim 4, wherein the second level is about 25 μA to about 1 mA.

6. A method of operating an imaging device comprising the acts of:
    resetting a floating diffusion region;
    pulsing a column line bias current from a first level to a second higher level during and after the resetting of the floating diffusion region; and
    sampling a pixel reset signal from the floating diffusion region when the bias current returns to the first level.

7. The method of claim 6, further comprising repeating the pulsing and sampling steps.

8. The method of claim 6, wherein pulsing the bias current is performed by pulsing a bias control voltage signal.

9. The method of claim 6, wherein the first level is about 100 nA to about 15 μA.

10. The method of claim 9, wherein the second level is about 25 μA to about 1 mA.

11. The method of claim 6, wherein sampling the pixel signal is performed by pulsing a sample and hold reset control signal.

12. The method of claim 6, wherein resetting the floating diffusion region is performed by pulsing a reset signal.

13. A method of operating an imaging device comprising the acts of:
    resetting a floating diffusion region;

reducing a resistance of a column line by pulsing a column line bias current from a first level to a second higher level during and after the resetting of the floating diffusion region;

sampling a pixel reset signal from the floating diffusion region;

transferring a charge from a photosensitive device to the floating diffusion region;

reducing the resistance of the column line by pulsing a column line bias current from a first level to a second higher level during and after the transferring; and sampling a pixel signal associated with the transferred charge.

14. The method of claim 13, wherein sampling the pixel reset signal occurs when the column line bias current returns to the first level.

15. The method of claim 13, wherein sampling the pixel signal associated with the transferred charge occurs when the column line bias current returns to the first level.

16. The method of claim 13, wherein pulsing the bias current is performed by pulsing a bias control voltage signal.

17. The method of claim 13, wherein the first level is about 100 nA to about 15 µA.

18. The method of claim 17, wherein the second level is about 25 µA to about 1 mA.

* * * * *